(12) United States Patent
Uno et al.

(10) Patent No.: US 8,675,294 B2
(45) Date of Patent: Mar. 18, 2014

(54) LENS DRIVING DEVICE

(75) Inventors: Masaru Uno, Tokyo (JP); Akira Suzuki, Tokyo (JP); Kazutomo Imi, Tokyo (JP)

(73) Assignee: TDK Corporation, Tokyo (JP)

( * ) Notice: Subject to any disclaimer, the term of this patent is extended or adjusted under 35 U.S.C. 154(b) by 29 days.

(21) Appl. No.: 13/416,774

(22) Filed: Mar. 9, 2012

(65) Prior Publication Data

US 2012/0236423 A1 Sep. 20, 2012

(30) Foreign Application Priority Data

Mar. 18, 2011 (JP) .................................. 2011-060527
Dec. 21, 2011 (JP) .................................. 2011-280333

(51) Int. Cl.
*G02B 7/02* (2006.01)

(52) U.S. Cl.
USPC .............................. 359/823; 359/822; 359/824

(58) Field of Classification Search
USPC ......... 359/811, 813, 814, 819, 822–824, 829; 396/72, 85
See application file for complete search history.

(56) References Cited

U.S. PATENT DOCUMENTS

| 5,768,038 A | 6/1998 | Emura |
| 2009/0040633 A1* | 2/2009 | Chikami ....................... 359/824 |
| 2009/0047009 A1* | 2/2009 | Nagano ........................... 396/55 |

FOREIGN PATENT DOCUMENTS

JP    A-10-90584    4/1998

* cited by examiner

*Primary Examiner* — Darryl J Collins
*Assistant Examiner* — Gary O'Neil
(74) *Attorney, Agent, or Firm* — Oliff PLC

(57) ABSTRACT

A lens driving device comprises a lens holder for holding a lens, a shaft for supporting the lens holder so as to make the lens holder movable in an optical axis direction of the lens and swingable about an axis of the shaft, an actuator for applying a driving force to the lens holder so as to move the lens holder in the optical axis direction; and an urging member for applying an urging force to the lens holder so as to rotate the lens holder toward the actuator. In the lens holder, a position where the urging force is applied by the urging member and a position where the driving force is applied by the actuator oppose each other, so that the urging force from the urging member is directed to the actuator.

16 Claims, 11 Drawing Sheets

Fig.7
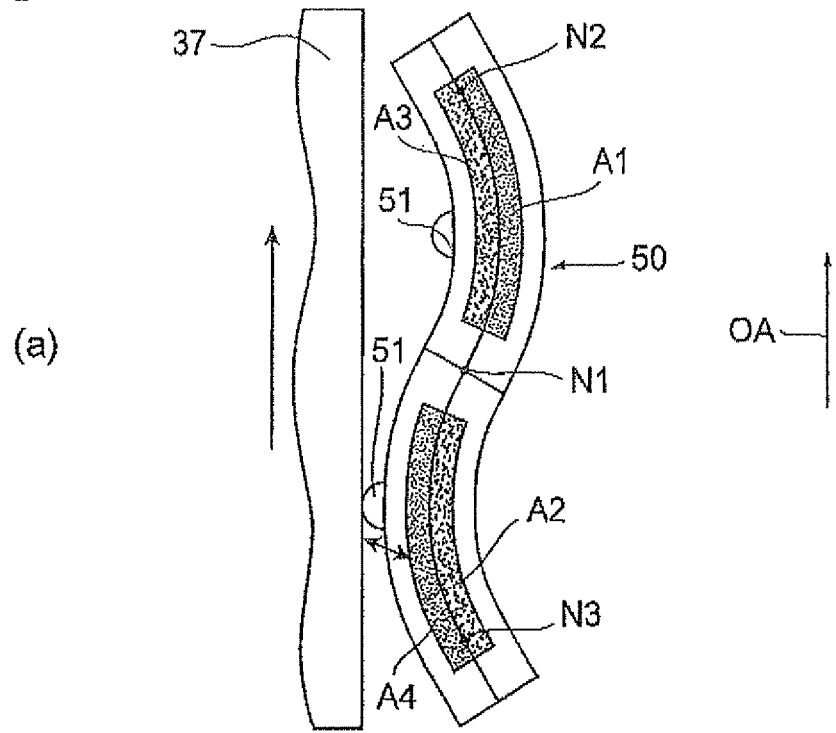
(a)
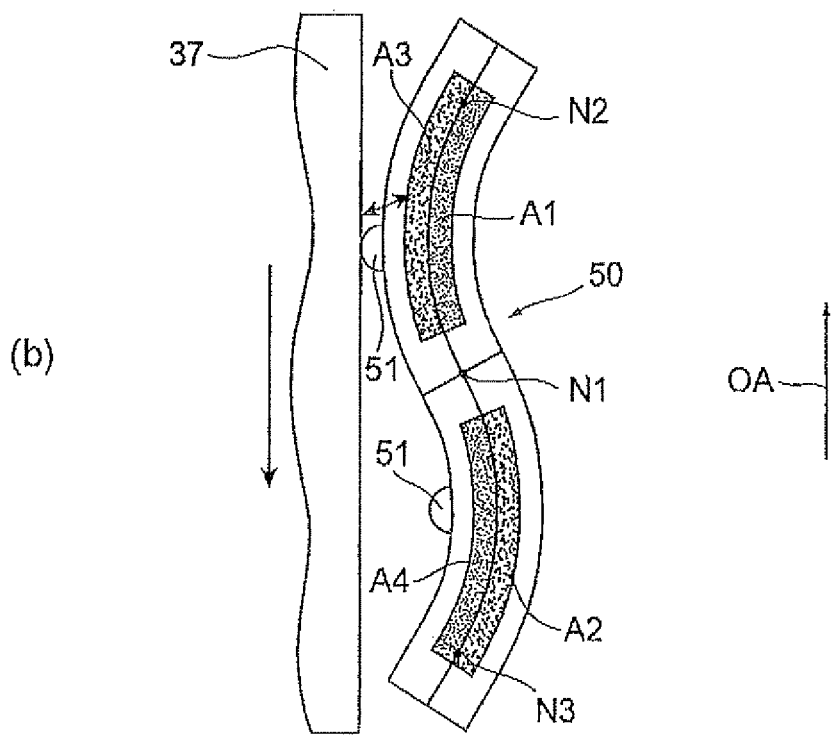
(b)

LENS DRIVING DEVICE

BACKGROUND OF THE INVENTION

1. Field of the Invention

The present invention relates to a lens driving device.

2. Related Background Art

Known as a lens driving device is one comprising a lens holder for holding a lens, a shaft for guiding the lens holder, an actuator for moving the lens holder along the shaft, and a press contact surface for press contact with the actuator (see, for example, Japanese Patent Application Laid-Open No. 10-90584). In order for the actuator to come into contact under pressure with the press contact surface, an urging member (spring) is arranged between the lens holder and the actuator or between the actuator and a securing part of the lens driving device in the lens driving device disclosed in Japanese Patent Application Laid-Open No. 10-90584.

SUMMARY OF THE INVENTION

However, the lens driving device disclosed in Japanese Patent Application Laid-Open No. 10-90584 has the following problems.

When arranged between the lens holder and the actuator, the urging member is located on a driving force transmission path from the actuator to the lens holder. This may cause a loss in the transmission of a driving force from the actuator to the lens holder, thereby making it harder to move the lens holder appropriately. When arranged between the actuator and the securing part, the urging member is also substantially located on the driving force transmission path from the actuator to the lens holder. In this case, the actuator itself may be vibrated by the urging member, which makes it hard to transmit the driving force of the actuator appropriately to the lens holder, thereby causing a loss in the transmission of the driving force from the actuator to the lens holder.

It is an object of the present invention to provide a lens driving device which can efficiently transmit the driving force from the actuator to the lens holder.

The lens driving device in accordance with the present invention comprises a lens holder holding a lens, a shaft supporting the lens holder so as to make the lens holder movable in an optical axis direction of the lens and swingable about an axis of the shaft, an actuator applying a driving force to the lens holder so as to move the lens holder in the optical axis direction, and an urging member applying an urging force to the lens holder so as to rotate the lens holder toward the actuator; while, in the lens holder, a position where the urging force is applied by the urging member and a position where the driving force is applied by the actuator oppose each other, so that the urging force from the urging member is directed to the actuator.

In the lens driving device in accordance with the present invention, the urging member applies an urging force to the lens holder so as to rotate the lens holder toward the actuator. This allows the lens holder and actuator to keep a favorable contact state therebetween. Since the respective positions where the urging force and driving force are applied by the urging member and actuator oppose each other in the lens holder so that the urging force from the urging member is directed to the actuator, the urging member is kept away from the driving force transmission path from the actuator to the lens holder. As a result, the driving force from the actuator is efficiently transmitted to the lens holder.

The lens driving device may further comprise a housing accommodating the lens holder, shaft, actuator, and urging member; the shaft being arranged at a first corner of the housing; the actuator being arranged at a second corner of the housing adjacent to the first corner; the urging member being arranged over the second corner and a third corner of the housing diagonally opposite from the first corner. In this case, the shaft and actuator are arranged at corners of the housing which are dead spaces, whereby the lens driving device can easily be made smaller.

The urging member may comprise a spring, an arm member having one end in contact with the spring, a substrate in contact with the other end of the arm member, and a ball member in contact with the substrate and lens holder while being supported so as to be rotatable with respect to the lens holder and substrate, a pressure from the spring being applied as the urging force to the lens holder through the arm member, substrate, and ball member. In this case, the structure of the urging member for applying the urging force to the lens holder can be achieved easily at low cost. Since the ball member in contact with the substrate and lens holder is rotatable, frictions occurring between the ball member and the substrate and lens holder are very small. This can prevent the ball member from resisting against the movement in the optical axis direction of the lens.

The lens driving device may further comprise a housing accommodating the lens holder, shaft, actuator, and urging member; the shaft being arranged at a first corner of the housing; the actuator, substrate, and ball member being arranged at a second corner of the housing adjacent to the first corner; the spring being arranged at a third corner of the housing diagonally opposite from the first corner; the arm member being arranged so as to extend between the second and third corners. In this case, the shaft, actuator, spring, and substrate are arranged at corners of the housing which are dead spaces, whereby the lens driving device can easily be made smaller.

The lens driving device may further comprise a housing accommodating the lens holder, shaft, actuator, and urging member; the shaft being arranged at a first corner of the housing, the actuator being arranged at a second corner of the housing adjacent to the first corner; the urging member being arranged at a third corner of the housing diagonally opposite from the first corner; the lens holder having a cylindrical body, a first surface projecting out of the body and being located at the second corner, and a second surface projecting out of the body, opposing the first surface, and being located at the third corner; the actuator applying the driving force to the first surface; the urging member applying the urging force to the second surface. In this case, the shaft, actuator, and urging member are arranged at corners of the housing which are dead spaces. The driving force is provided by the actuator within the second corner, while the urging force is provided by the urging member within the third corner. Even when the lens holder is made larger, areas for the members for providing the driving force and urging force are secured in dead spaces, whereby the driving force and urging force are not inhibited from being applied to the lens holder. This can make the lens holder larger and the lens driving device smaller at the same time. As a result, a smaller lens driving device can be obtained when the lens holder has a size on a par with that conventionally available. When the lens driving device has a size on a par with that conventionally available, the lens holder can be made larger, whereby a lens having a larger diameter can be mounted to the lens holder.

The urging member may comprise a spring; a base including a first main face in contact with the spring and a second main face, formed with a recess, opposing the first main face; and a ball member arranged so as to be rotatable within the recess of the base; a pressure from the spring being applied as the urging force to the lens holder through the base and ball member. This simplifies the structure of the urging member applying the urging force to the lens holder, so as to reduce the number of components, whereby the lens driving device can be made at lower cost. Since the ball member arranged within the recess of the substrate is rotatable, the friction occurring between the ball member and the lens holder when they come into contact with each other is very small. This can prevent the ball member from resisting against the lens holder moving in the optical axis direction of the lens.

The lens driving device may further comprise an elastic member generating an elastic force for pressing the actuator to the lens holder. In this case, the elastic member is interposed between the actuator and the housing and thus can absorb errors occurring, if any, in components. Since the elastic force provided by the elastic member presses the actuator to the lens holder, the contact state of the actuator with the lens holder is kept appropriately. Therefore, even when the actuator and the lens holder positionally deviate from each other, a favorable margin for tilt (inclination of the lens holder with respect to the optical axis of the lens) can be obtained.

The present invention can provide a lens driving device which can efficiently transmit the driving force from the actuator to the lens holder.

The present invention will be more fully understood from the detailed description given here in below and the accompanying drawings which are given by way of illustration only, and thus are not to be considered as limiting the present invention.

BRIEF DESCRIPTION OF THE DRAWINGS

FIG. 7 is a schematic view illustrating how the piezoelectric actuator is driven;

DESCRIPTION OF THE PREFERRED EMBODIMENTS

In the following, preferred embodiments of the present invention will be explained in detail with reference to the accompanying drawings. In the explanation, constituents identical to each other or those having the same functions will be referred to with the same signs, while omitting their overlapping descriptions.

First Embodiment

Figure 1:
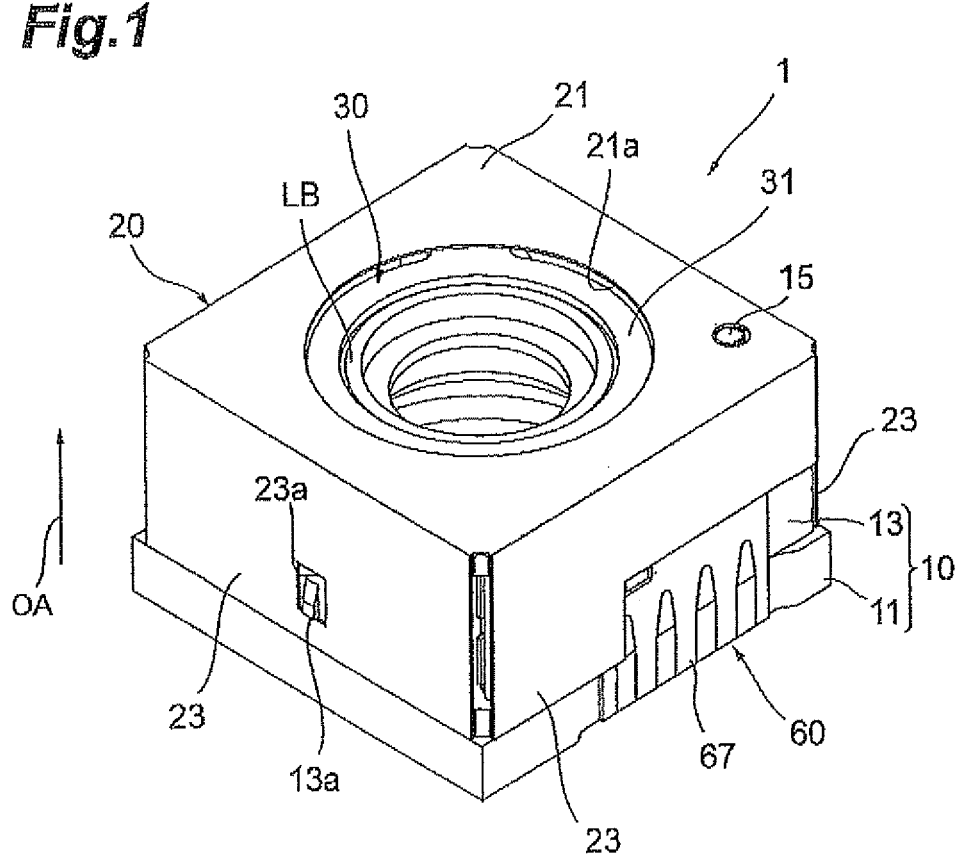
FIG. 1 is a perspective view illustrating the lens driving device in accordance with a first embodiment.
Figure 2:
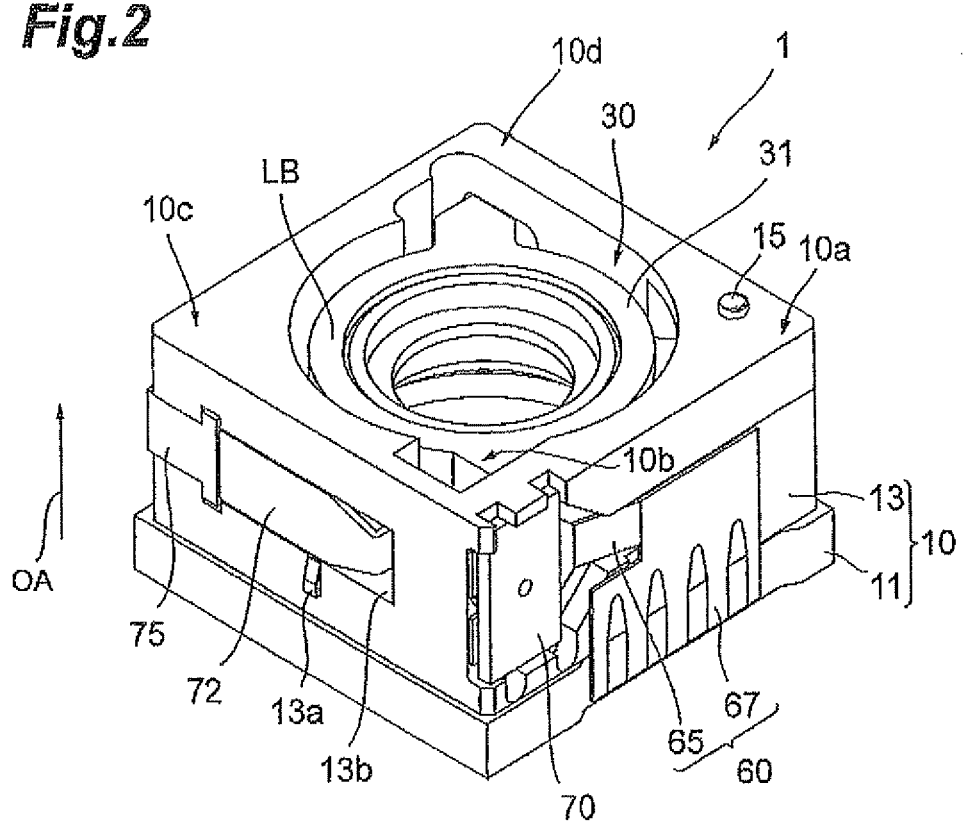
FIG. 2 is a perspective view illustrating the lens driving device in accordance with the first embodiment.
Figure 3:
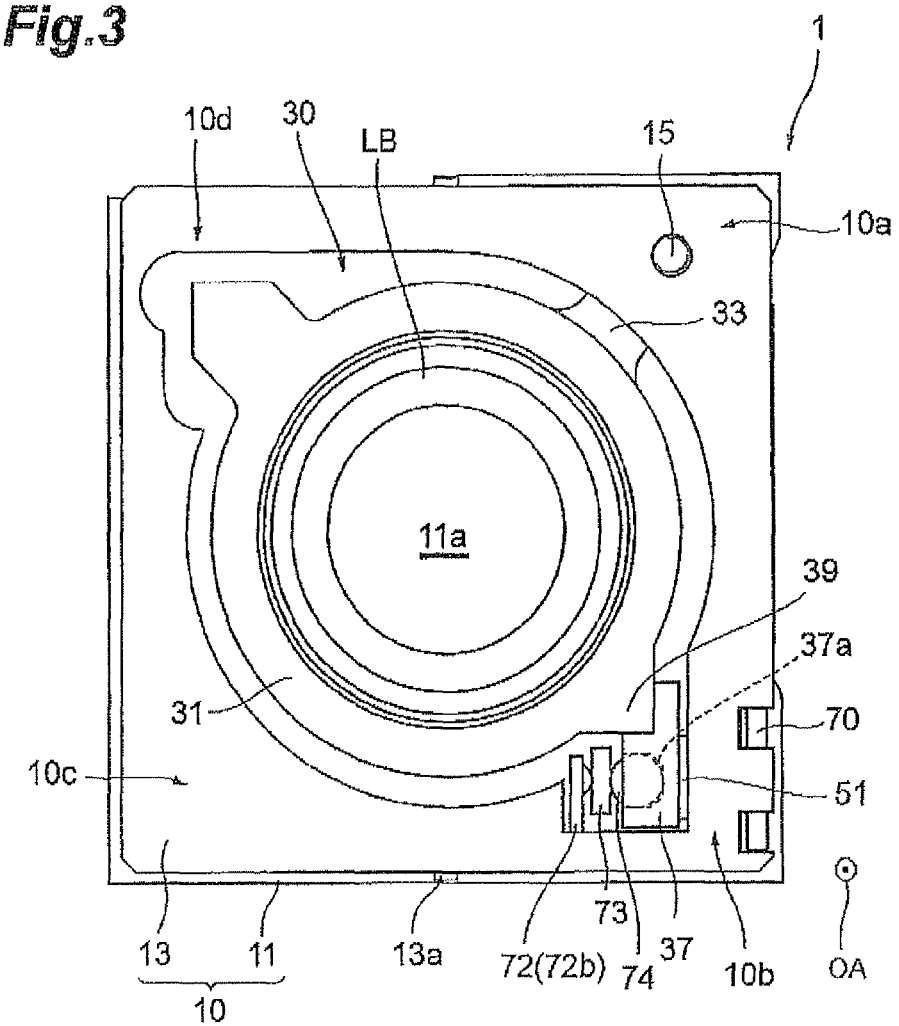
FIG. 3 is a plan view illustrating the lens driving device in accordance with the first embodiment.
Figure 4:
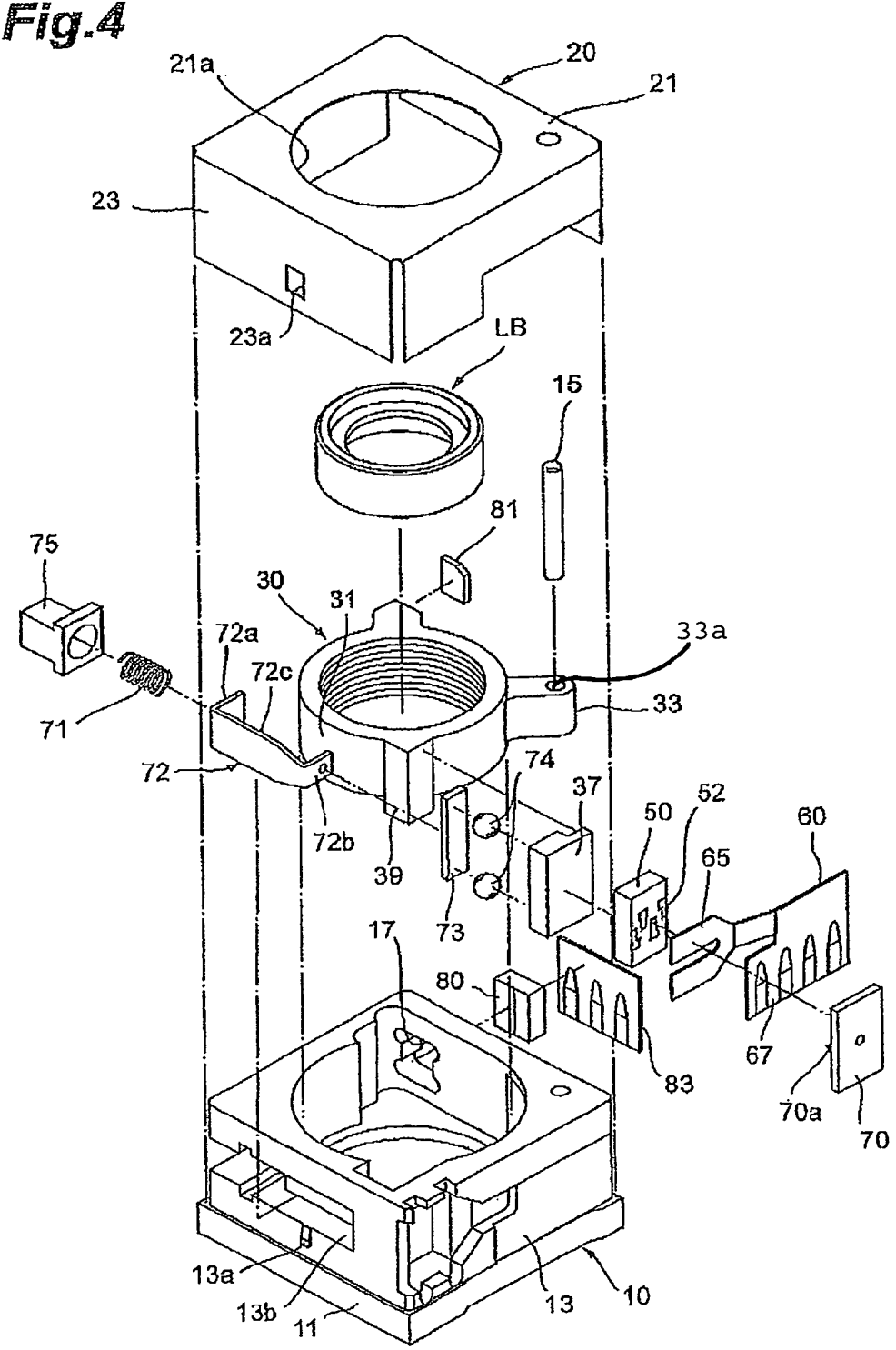
FIG. 4 is an exploded perspective view illustrating the lens driving device in accordance with the first embodiment.

FIGS. 1 and 2 are perspective views illustrating the lens driving device in accordance with the first embodiment. FIG. 3 is a plan view illustrating the lens driving device in accordance with the first embodiment. FIG. 4 is an exploded perspective view illustrating the lens driving device in accordance with the first embodiment. FIGS. 2 and 3 illustrate the lens driving device 1 in a state where a cover 20 which will be explained later is removed.

As illustrated in FIGS. 1 to 4, the lens driving device 1 comprises a base 10, the cover 20, a lens holder 30, and a piezoelectric actuator unit and an urging member which will be explained later. The lens driving device 1 is a device for driving a camera lens mounted to a mobile phone, for example. The lens driving device 1 has a two-dimensional form which is set to 8.5 mm×8.5 mm, for example. In the first embodiment, the base 10 and cover 20 function as a housing.

The base 10 has a bottom part 11 formed with a truly circular aperture 11a and a side wall part 13 erected from the bottom part 11. The base 10 (bottom part 11) has a substantially rectangular form when seen as a plane. The side wall part 13 is integrally formed with the bottom part 11 throughout four sides thereof. The side wall part 13 has an inner peripheral face curved along the form of the aperture 11a. The bottom part 11 and side wall part 13 define a space for accommodating the lens holder 30. The base 10 is formed by a liquid crystal polymer containing a filler such as glass fiber or an inorganic matter, for example. The substantially rectangular form includes not only forms having right-angled corners, but also those with chamfered corners.

The side wall part 13 is provided with a plurality of engagement projections 13a for attaching the cover 20 thereto. A shaft 15 is arranged at a corner 10a of the base 10. At the corner 10a of the base 10, a space is formed such as to cut out a portion of the side wall part 13, and the shaft 15 is arranged in the space. The shaft 15 has one end supported by the bottom part 11 and the other end supported by a portion of the side wall part 13 opposing the bottom part 11. The shaft 15 bridges the bottom part 11 and side wall part 13. The shaft 15 has a truly circular cross section and is made of stainless steel, for example. The axial direction of the shaft 15 is set parallel to an optical axis direction OA of the lens.

The cover 20 has a hollow substantially rectangular parallelepiped form which opens on one side. The cover 20 has a front face part 21 opposing the bottom part 11 and side wall parts 23 respectively extending from four sides of the front face part 21. The front face part 21 is formed with a truly circular aperture 21a at a position opposing the aperture 11a. The side wall parts 23 are formed with openings 23a at positions corresponding to the engagement projections 13a. The cover 20 is attached to the base 10 when the engagement projections 13a fit into their corresponding openings 23a. The cover 20 is formed by SPCC (cold rolled steel sheet), for example.

The lens holder 30 has a cylindrical body 31, which is arranged in an accommodation space defined by the bottom part 11 and side wall part 13. The body 31 has a truly circular cross section. A lens barrel LB containing a lens is attached to the inside of the body 31. The lens holder 30 holds the lens by attaching thereto the lens barrel LB. The lens held by the lens barrel LB is exposed through the apertures 11a, 21a. The lens holder 30 is formed by a liquid crystal polymer containing a carbon fiber or by nylon, for example.

The outer side face of the body 31 is formed with a shaft support part 33, projecting out of the body 31, for supporting the shaft 15. The body 31 and shaft support part 33 are formed integrally with each other. The shaft support part 33 is formed with a through hole 33a through which the shaft 15 is inserted. The through hole 33a has a truly circular cross section corresponding to the cross-sectional form of the shaft 15. While the shaft 15 is inserted through the through hole 33a, the lens holder 30 is supported so as to be movable in the axial direction of the shaft 15 (the optical axis direction OA of the lens) and swingable about the shaft 15.

The lens holder 30 has a substrate 37 adapted to abut friction parts 51 of a piezoelectric actuator 50 which will be explained later. The substrate 37 is secured to a substrate support part 39 disposed on the outer side face of the body 31 near a corner 10b adjacent to the corner 10a of the base 10. This allows the substrate 37 to function substantially as a side face of the lens holder 30. The substrate 37 is made of SIC or zirconia, for example. The substrate 37 may be formed integrally with the lens holder 30.

As also illustrated in FIG. 4, the piezoelectric actuator unit has the piezoelectric actuator 50 and a flexible substrate 60.

The piezoelectric actuator 50, which is a so-called multilayer piezoelectric actuator, is arranged near the substrate 37 (substrate support part 39), so as to be located at the corner 10b of the base 10 (bottom part 11). As shown in FIG. 7, the piezoelectric actuator 50 has a plurality of (four in the first embodiment) active parts A1 to A4 which expand and contract according to the level of a voltage applied thereto. On one side of the piezoelectric actuator 50, a plurality of (two in the first embodiment) friction parts 51 are placed along the direction in which the active parts A1 to A4 are arranged.

On the other side of the piezoelectric actuator 50, a plurality of (four in this embodiment) outer electrodes 52 are disposed so as to correspond to positions (node points) free of expansion and contraction. The outer electrodes 52 extend from their corresponding node points to an end part of the piezoelectric actuator 50. That is, each outer electrode 52 has one end part located at a node point and the other end part separated from the node point. Each outer electrode 52 has the other end part connected to the flexible substrate 60.

Figure 6:
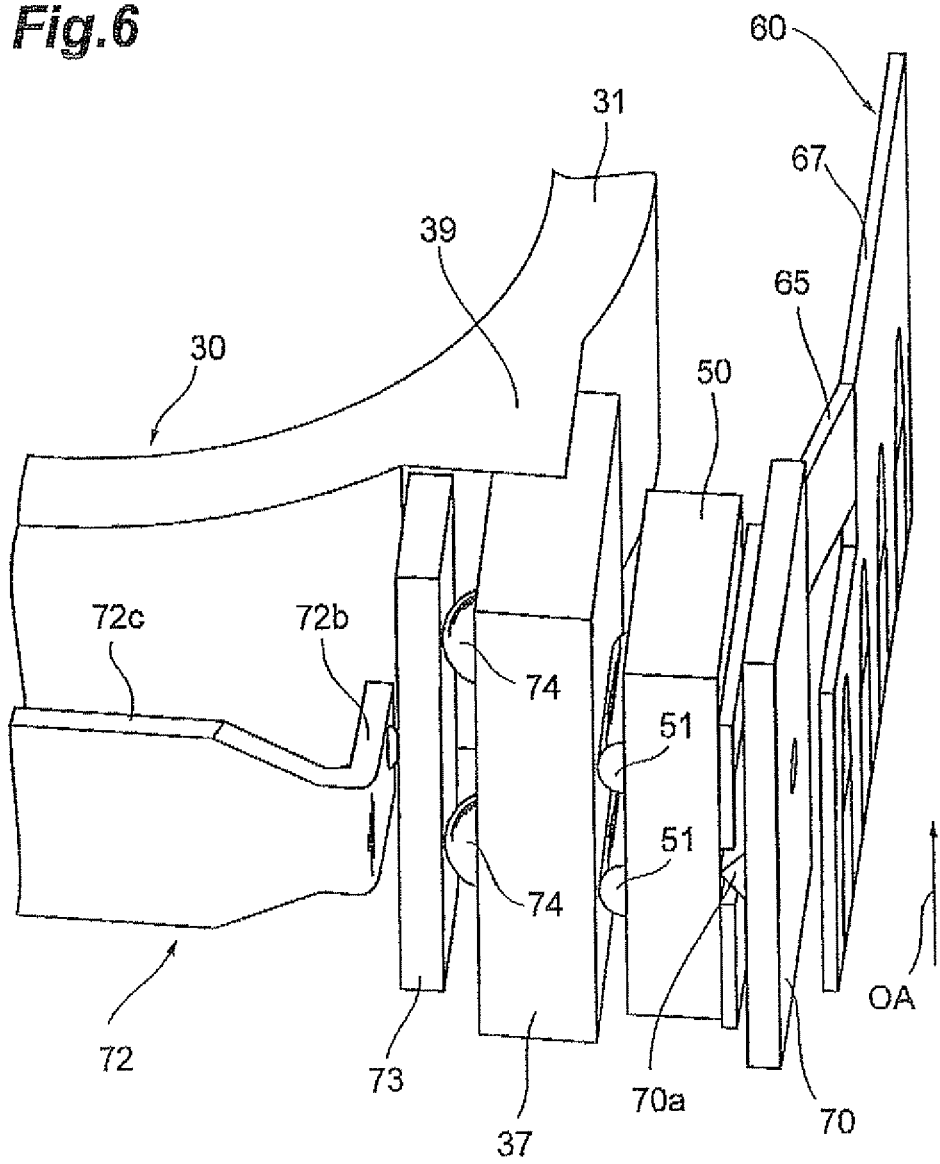
FIG. 6 is a perspective view illustrating a contact state between the piezoelectric actuator and a substrate.

As also illustrated in FIG. 6, the friction parts 51, each formed like a substantially semicircular column, are arranged so as to be separated from each other in the optical axis direction OA of the lens and extend in a direction orthogonal to the optical axis direction OA. The friction parts 51 abut the substrate 37, thereby indirectly coming into contact with the side face of the lens holder 30.

The piezoelectric actuator 50 has two resonance modes when driven. Specifically, the piezoelectric actuator 50 vibrates according to superposition of a longitudinal vibration mode (first vibration mode) vibrating in the longitudinal direction of the piezoelectric actuator 50 and a bending vibration mode (second vibration mode) in the thickness direction of the piezoelectric actuator 50 on each other.

Driving the active part A1 constituted by a first inner electrode, a grounding inner electrode, and a piezoelectric layer and the active part A4 constituted by a fourth inner electrode, a grounding inner electrode, and a piezoelectric layer brings one friction part 51 into contact with the substrate 37 as illustrated in (a) of FIG. 7, thereby causing a frictional force between the one friction part 51 and substrate 37. The frictional force generated between the one friction part 51 and substrate 37 moves the substrate 37 in the arrowed direction in (a) of FIG. 7.

Driving the active part A2 constituted by a second inner electrode, a grounding inner electrode, and a piezoelectric layer and the active part A3 constituted by a third inner electrode, a grounding inner electrode, and a piezoelectric layer brings the other friction part 51 into contact with the substrate 37 as illustrated in (b) of FIG. 7, thereby causing a frictional force between the other friction part 51 and substrate 37. The frictional force generated between the other friction part 51 and substrate 37 moves the substrate 37 in the arrowed direction in (b) of FIG. 7.

When the piezoelectric actuator 50 is driven by applying voltages having phases shifted from each other by 90° to the outer electrodes 52 connected to the first and second inner electrodes, respectively, elliptical motions whose phases shift from each other by 180° occur in the respective friction parts 51, thereby alternately causing the frictional force to act on the substrate 37, so as to move the substrate 37 (lens holder 30). That is, the friction parts 51 of the piezoelectric actuator 50 drive the lens holder 30 along the optical axis direction OA of the lens.

In the example illustrated in FIG. 7, letting L be the length of the piezoelectric actuator 50 in the arrangement direction thereof (the optical axis direction OA of the lens), three node points N1, N2, N3 exist at the boundary among the piezoelectric devices and at about L/6 inside from both ends of the actuator 50. The node point N1 is kept from being displaced in the arrangement direction and thickness direction of the piezoelectric devices, while the node points N2, N3 are displaceable in the arrangement direction of the piezoelectric devices but not in the thickness direction thereof.

Each outer electrode 52 is connected to its corresponding inner electrode at a position corresponding to the center node point N1, i.e., at one end part. The respective one end parts of the outer electrodes 52 are arranged so as to be separated from each other at the center node point N1.

The flexible substrate 60 is a so-called flexible printed circuit (FPC) having a film-shaped insulator and a wiring part disposed on the insulator. The wiring part includes leads to be connected to the respective outer electrodes 52 by soldering or the like. The flexible substrate 60 (insulator) is arranged along one side of the base 10 (side wall part 13). In the first embodiment, the flexible substrate 60 is arranged so as to extend between the corners 10a, 10b.

As also illustrated in FIG. 4, the flexible substrate 60 includes a first part 65 extending in a direction parallel to the above-mentioned one side and a second part 67 extending from the first part 65 along the optical axis direction OA of the lens. Securing the second part 67 to the side wall part 13 by bonding or the like positions the flexible substrate 60 with respect to the base 10, lens holder 30, and the like. The second part 67 is drawn out of the lens driving device 1 through an interstice formed between the base 10 and cover 20. The piezoelectric actuator 50 is mounted to a leading end region of the first part 65 of the flexible substrate 60.

The leading end region of the first part 65 is bifurcated into two branches separated from each other in the optical axis direction OA of the lens. The leading end region of the first part 65 is positioned such that the area between the two branches corresponds to the center node point N1 of the piezoelectric actuator 50. This exposes the node point N1 of the piezoelectric actuator 50 when seen from the flexible substrate 60 side. Since the leading end region of the first part 65 is bifurcated, the piezoelectric actuator 50 is mechanically connected to the leading end region of the first part 65 at a position separated from the center node point N1. This can prevent the flexible substrate 60 from inhibiting the above-mentioned vibration of the piezoelectric actuator 50.

On the rear face of the surface on which the piezoelectric actuator 50 is mounted in the leading end region of the first part 65, a plate member 70 is arranged so as to oppose the rear face. That is, the plate member 70 is arranged so as to hold the flexible substrate 60 (the leading end region of the first part 65) with the piezoelectric actuator 50. The plate member 70 is secured to the base 10 (side wall part 13) by bonding or the like. The plate member 70 is made of ceramics or stainless steel, for example.

In the plate member 70, the surface opposing the leading end region of the first part 65, i.e., the surface opposing the piezoelectric actuator 50 through the flexible substrate 60, is formed with a projection 70a. The projection 70a is positioned so as to correspond to the region between the two branches in the leading end region of the first part 65 and exposed when seen from the flexible substrate 60 side. The projection 70a has a substantially triangular cross section and extends along the width direction of the plate member 70. In the state where the plate member 70 is secured to the base 10, the projection 70a extends along a direction orthogonal to the optical axis direction OA of the lens.

The projection 70a of the plate member 70 is secured to the center node point N1 of the piezoelectric actuator 50 by bonding or the like. This determines the position of the piezoelectric actuator 50 with respect to the base 10 and the contact state of each friction part 51 with the lens holder 30 (substrate 37). Since the piezoelectric actuator 50 and plate member 70 are secured to each other at the node point N1, their bond can be prevented from inhibiting the above-mentioned vibration of the piezoelectric actuator 50.

The position where the plate member 70 is bonded to the piezoelectric actuator 50 is preferably a node point which is free of expansion and contraction as piezoelectric devices as mentioned above. For securely bonding the piezoelectric actuator 50 and plate member 70 to each other, however, the position where the plate member 70 is bonded may extend to a position shifted from the node point.

Figure 5:
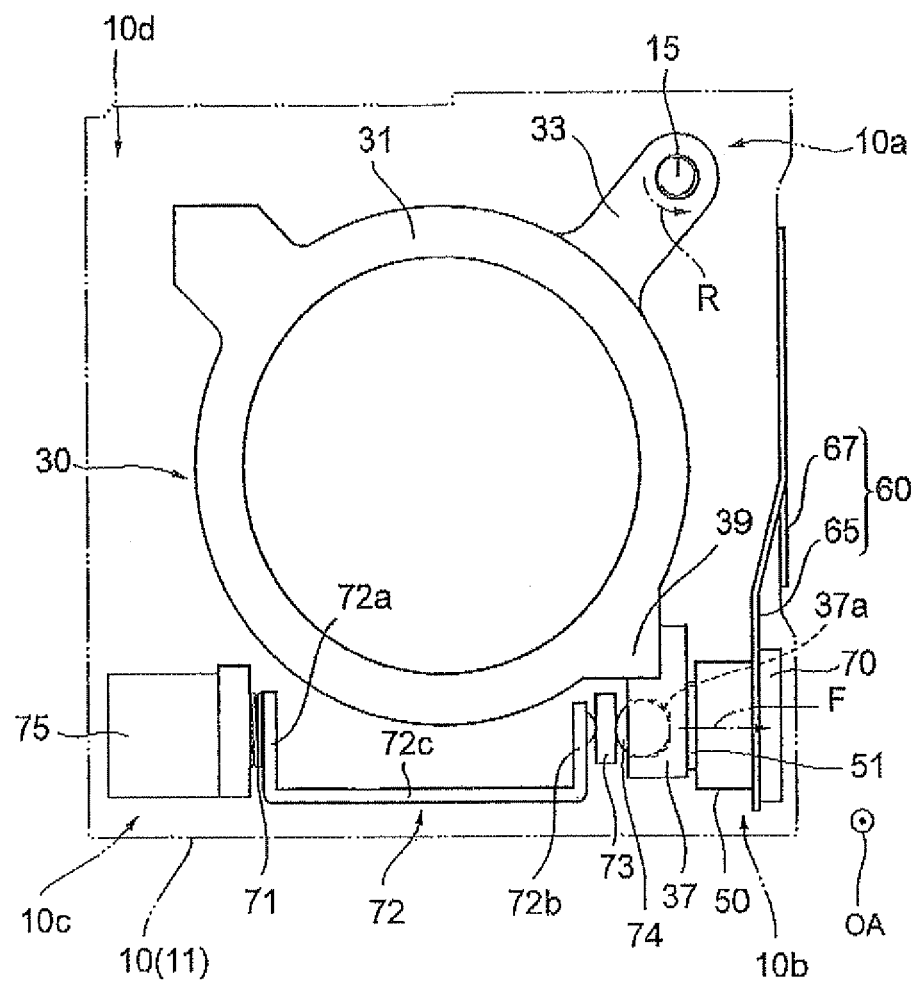
FIG. 5 is a diagram illustrating the relationship between a lens holder, a shaft, a piezoelectric actuator, and an urging member.

As also illustrated in FIG. 5, the urging member has a spring 71, an arm member 72, a substrate 73, and ball members 74. The urging member abuts the lens holder 30 and applies an urging force F thereto so as to rotate the lens holder 30 toward the piezoelectric actuator 50 (in the arrowed direction R in the drawing), i.e., such that the friction parts 51 come into contact with the substrate 37. The urging member (constituted by the spring 71, arm member 72, substrate 73, and ball members 74) is arranged over the corner 10b and the corner 10c diagonally opposite from the corner 10a in the base 10 and located within a recess 13b formed in the outer side face of the side wall part 13.

The spring 71 is arranged at the corner 10c of the base 10, so as to be accommodated in a bottomed tubular member 75. The tubular member 75 has a flange formed on its open end side. The flange engages a groove formed on the outer side face of the side wall part 13, thereby positioning the tubular member 75. The tubular member 75 is secured to the side wall part 13 (base 10) by bonding or the like. The first embodiment uses a compression coil spring as the spring 71.

The arm member 72 is arranged within the recess 13b so as to extend between the corners 10b, 10c. The arm member 72 includes an abutment 72a in contact with the spring 71, an abutment 72b in contact with the substrate 73, and a joint 72c connecting the abutments 72a, 72b to each other. The abutments 72a, 72b extend from respective ends of the joint 72e in a direction intersecting it. For example, the arm member 72 is made of stainless steel and formed by press-molding the same.

The substrate 73 is arranged at the corner 10c of the base 10 and includes a main face opposing the abutment 72b of the arm member 72. The substrate 73 is secured by bonding or the like to the abutment 72b while the main face is in contact with the abutment 72b. The abutment 72b is formed with a projection, so that the substrate 73 and arm member 72 (abutment 72b) are secured to each other while the projection and main face are in point contact with each other. The substrate 73 is made of SiC or zirconia, for example.

The ball members 74 are arranged at the corner 10c of the base 10 and abut the rear face of the main face of the substrate 73. There are a plurality of (two in the first embodiment) ball members 74, which are arranged in a row along the optical axis direction OA (the axial direction of the shaft 15). The ball members 74 are accommodated in depressions 37a formed on the rear face of the surface of the substrate 37 in contact with the friction parts 51. The ball members 74 also abut the substrate 37 while being accommodated in the depressions 37a formed in the substrate 37. Hence, the ball members 74 are held between and supported by the substrates 37, 73. The ball members 74 are supported so as to be rotatable with respect to the substrate 73 and the substrate 37 (lens holder 30).

The recesses 37a formed in the substrate 37 are independent from each other for the respective ball members 74. The length of each depression 37a in the optical axis direction OA of the lens is set such that its corresponding ball member 74 is movable by a predetermined distance in the optical axis direction OA of the lens within the depression 37a. The ball members 74 are made of stainless steel, for example.

The spring 71, which is in a desirable compression state, abuts the bottom part of the tubular member 75 and the abutment 72a of the arm member 72 and presses the arm member 72. The pressure from the spring 71 is applied as the urging force F to the substrate 37, i.e., the lens holder 30, through the arm member 72, substrate 73, and ball members 74.

In the lens driving device 1, the friction parts 51 of the piezoelectric actuator 50 abut the substrate 37 on one surface side thereof, whereby the driving force from the actuator 50 is applied to the substrate 37. The ball members 74 abut the substrate 37 on the other surface side, so as to apply the urging force F of the urging member thereto. Hence, in the substrate 37 (lens holder 30), the respective positions where the urging force F and driving force are applied by the urging member and piezoelectric actuator 50 oppose each other. The urging force F from the urging member is directed to the piezoelectric actuator 50.

The lens driving device 1 further comprises a position detector 80 for detecting the position of the lens holder 30 in the optical axis direction OA of the lens. The position detector 80 has a light-emitting device (e.g., light-emitting diode) and a light-receiving device (e.g., photodiode). The position detector 80 is arranged at a corner 10d diagonally opposite from the corner 10b in the base 10. The side wall part 13 is formed with an opening 17 at a position corresponding to the position detector 80. The position detector 80 is secured to the base 10 by bonding or the like. In the position detector 80, light emitted from the light-emitting device passes through the opening 17, so as to impinge on a reflection board 81 secured to the outer side face of the lens holder 30, and the light reflected by the reflection board 81 passes through the opening 17 again, so as to be made incident on and detected by the light-receiving device.

The position detector 80 is mounted to a flexible substrate 83. As with the flexible substrate 60, the flexible substrate 83 is an FPC and has a film-shaped insulator and a wiring part arranged on the insulator. The wiring part includes a lead to be connected to a terminal electrode of the position detector 80 by soldering or the like. An output signal of the position detector 80 (light-receiving device) is sent to an undepicted control unit through the wiring part of the flexible substrate 83. According to a known technique, the control unit determines the position in the optical axis direction OA of the lens based on the output signal of the position detector 80. The control unit outputs a driving signal for the light-emitting device, which is fed to the light-emitting device through the wiring part of the flexible substrate 83.

In the first embodiment, as in the foregoing, the urging member (constituted by the spring 71, arm member 72, substrate 73, and ball members 74) always applies the urging force F to the lens holder 30 so as to make it rotate toward the piezoelectric actuator 50 (in the arrowed direction R in FIG. 5). Therefore, the lens holder 30 (substrate 37) and piezoelectric actuator 50 (friction parts 51) keep a favorable contact state therebetween. The respective positions where the urging force F and driving force are applied by the urging member and actuator oppose each other in the lens holder 30 (substrate 37), so that the urging force F from the urging member is directed to the piezoelectric actuator 50. This keeps the urging member away from the driving force transmission path from the piezoelectric actuator 50 to the lens holder 30. As a result, the driving force from the piezoelectric actuator 50 is efficiently transmitted to the lens holder 30.

In the first embodiment, as mentioned above, the respective positions where the urging force F and driving force are applied by the urging member and actuator oppose each other in the lens holder 30 (substrate 37), so that the urging force F from the urging member is directed to the piezoelectric actuator 50, whereby the urging force F required for attaining a desirable contact state between the lens holder 30 and piezoelectric actuator 50 is small. This lowers the load acting on the shaft 15, thereby reducing the friction between the shaft 15 and the lens holder 30. This can save the driving force for moving the lens holder 30, cut down the power consumption for driving the lens holder 30, and elongate the life of the lens driving device 1.

In the first embodiment, the ball members 74 arranged at the corner 10b of the base 10 abut the substrate 37, thereby restraining the lens holder 30 from swinging away from the piezoelectric actuator 50. That is, a position for inhibiting the lens holder 30 from swinging is set at the corner 10b separated from the corner 10a where the shaft 15 is arranged. Thus separating the position for restricting the swinging of the lens holder 30 from the shaft 15 can improve the precision of the moving position of the lens holder 30 in the optical axis direction OA of the lens.

In the first embodiment, the urging member has the spring 71, arm member 72, substrate 73, and ball members 74, while the pressure from the spring 71 is applied as the urging force F to the lens holder 30 (substrate 37) through the arm member 72, substrate 73, and ball members 74. As a consequence, the urging member for applying the urging force F to the lens holder 30 can be constructed easily at low cost. On the other hand, the ball members 74 in contact with the substrate 73 and substrate 37 (lens holder 30) are rotatable, so that frictions occurring between the ball members 74 and substrates 37, 73 are very small. This can prevent the ball members 74 from resisting against the movement in the optical axis direction OA of the lens.

In the first embodiment, the lens holder 30, shaft 15, piezoelectric actuator 50, and urging member (constituted by the spring 71, arm member 72, substrate 73, and ball members 74) are accommodated in a housing constructed by the base 10 and cover 20. The shaft 15 is arranged at the corner 10a of the base 10; the piezoelectric actuator 50, substrate 73, and ball members 74 are arranged at the corner 10b of the base 10; the spring 71 is arranged at the corner 10c of the base 10; and the arm member 72 is arranged so as to extend between the corners 10b, 10c. As a consequence, the shaft 15, piezoelectric actuator 50, spring 71, and substrate 73 are arranged at corners of the housing which are dead spaces, whereby the lens driving device 1 can easily be made smaller.

Second Embodiment

The lens driving device 2 in accordance with the second embodiment will now be explained with reference to FIGS. 8 to 11. The following will mainly explain differences from the structure of the lens driving device 1 in accordance with the first embodiment, while omitting their overlapping descriptions.

Figure 8:
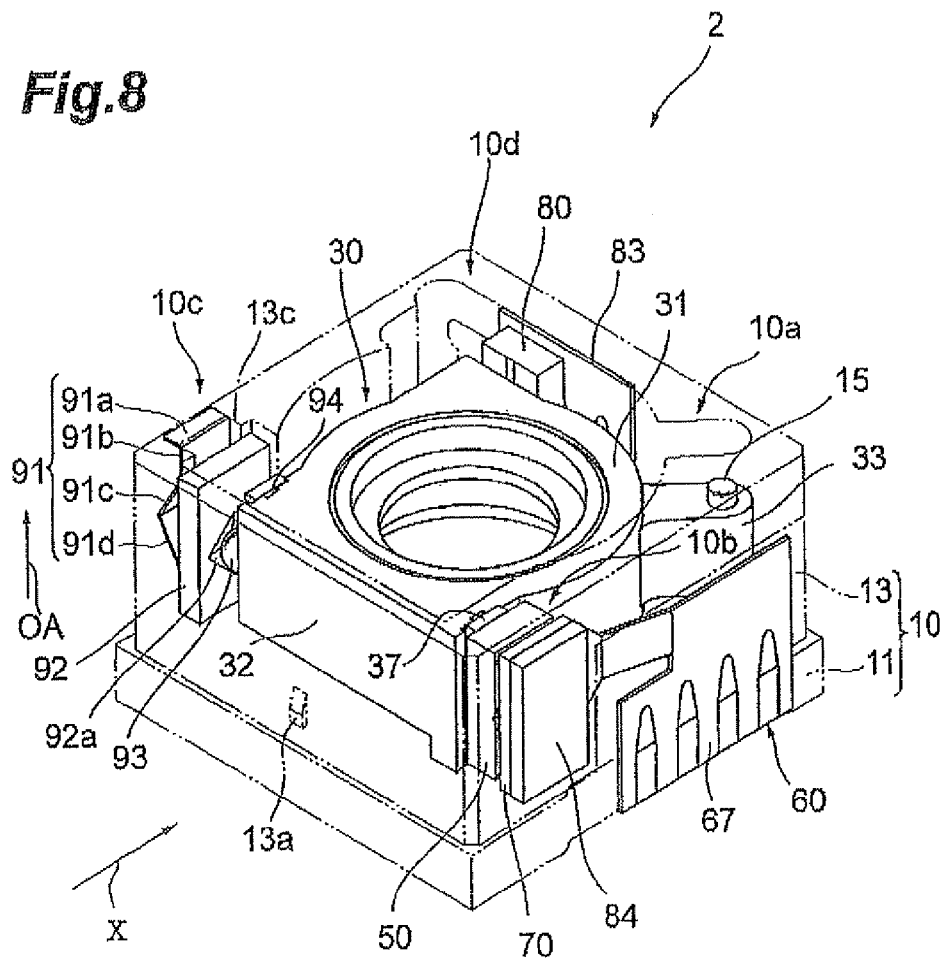
FIG. 8 is a perspective view illustrating the lens driving device in accordance with a second embodiment.
Figure 9:
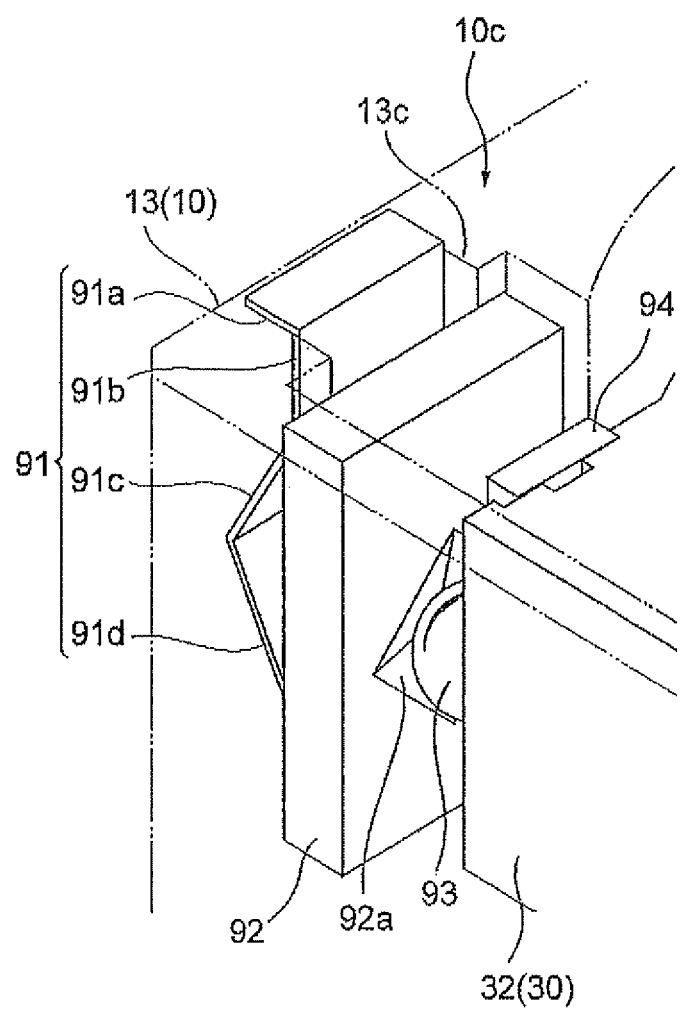
FIG. 9 is a diagram illustrating under magnification the urging member and its vicinity in the lens driving device in accordance with the second embodiment.
Figure 10:
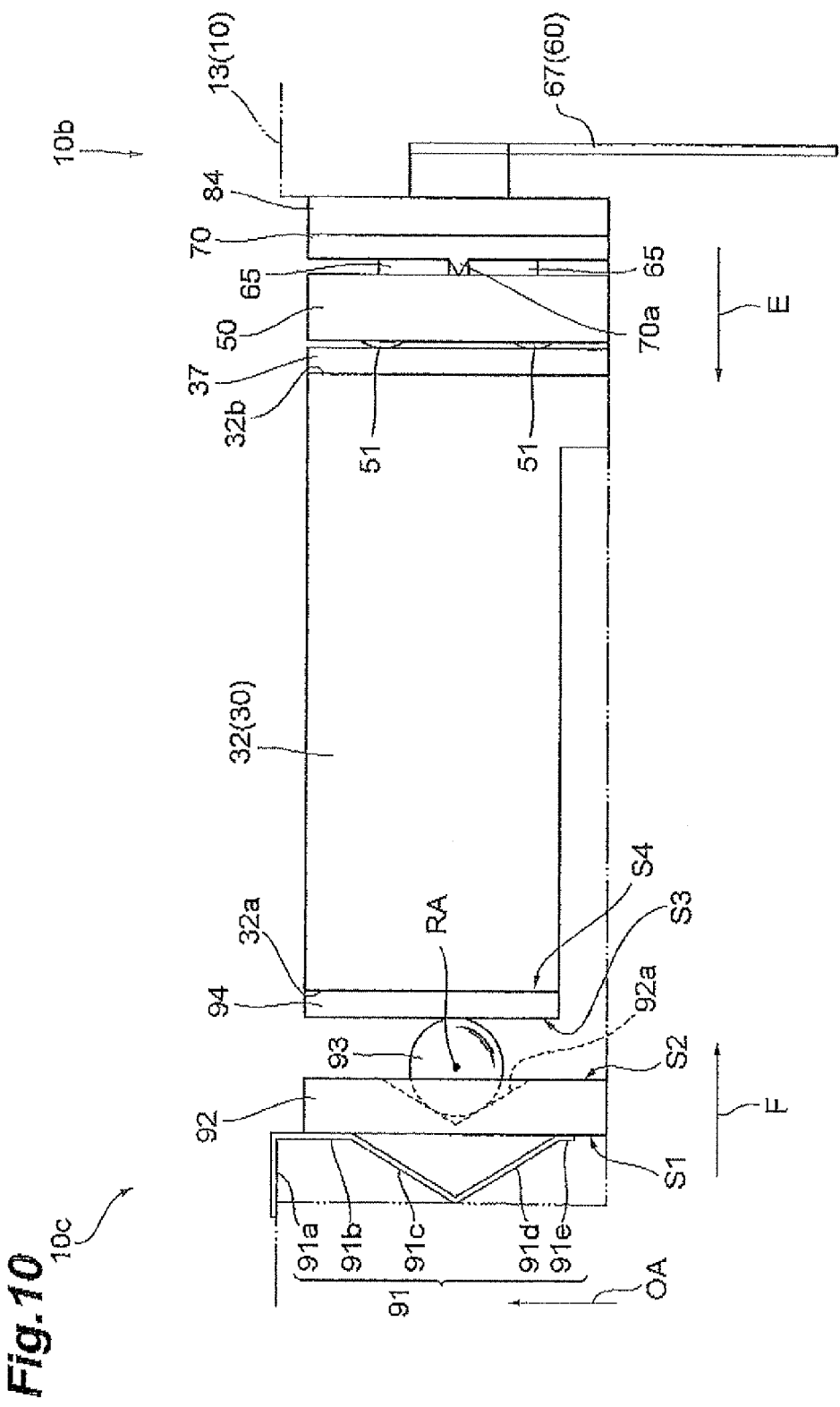
FIG. 10 is a diagram illustrating the lens driving device in accordance with the second embodiment as seen in a first direction X.
Figure 11:
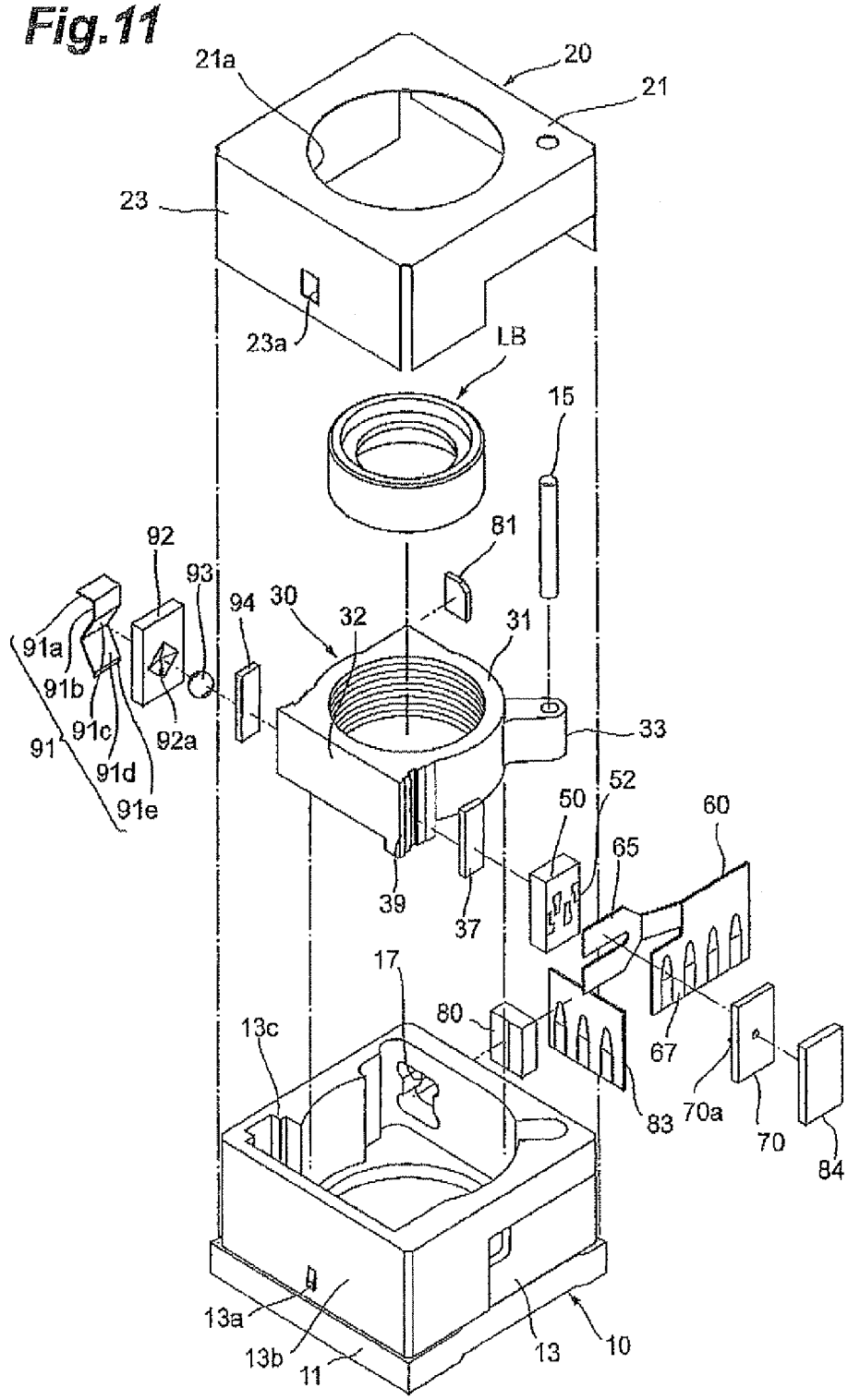
FIG. 11 is an exploded perspective view illustrating the lens driving device in accordance with the second embodiment.

FIG. 8 is a perspective view illustrating the lens driving device in accordance with the second embodiment. FIG. 9 is a diagram illustrating under magnification the urging member and its vicinity in the lens driving device in accordance with the second embodiment. FIG. 10 is a diagram illustrating the lens driving device in accordance with the second embodiment as seen in a first direction X (see FIG. 8) orthogonal to the optical axis direction OA of the lens. FIG. 11 is an exploded perspective view illustrating the lens driving device in accordance with the second embodiment.

As illustrated in FIGS. 8 and 11, the lens driving device 2 comprises a base 10, a cover 20, a lens holder 30, and a piezoelectric actuator unit and an urging member which will be explained later. The second embodiment differs from the first embodiment mainly in the structures of the lens holder 30 and urging member.

As illustrated in FIGS. 8 and 11, the lens holder 30 has a cylindrical body 31, a projection 32 projecting out of the body 31, and a shaft support part 33. The projection 32 is disposed on the side opposite from the shaft support part 33 across the body 31. The projection 32 extends in a second direction (tangential direction of the body 31 when seen in the optical axis direction OA of the lens) orthogonal to both of the optical axis direction OA of the lens and the first direction X. The projection 32 is located between the corners 10b, 10c of the base 10 in the state where the lens holder 30 is mounted to the base 10.

As illustrated in FIG. 10, the projection 32 has side wall faces 32a, 32b located at the corners 10c, 10b of the base 10, respectively. The side wall faces 32a, 32b project out of the body 31 so as to extend along the first direction X. The side wall faces 32a, 32b oppose each other in the second direction.

As illustrated in FIGS. 8 to 11, the urging member has a leaf spring 91, a plate member 92, and a ball member 93. The urging member (constituted by the leaf spring 91, plate member 92, and ball member 93) is located at the corner 10c of the base 10.

The leaf spring, which is formed by bending one sheet-shaped body, includes first, second, third, fourth, and fifth parts 91a, 91b, 91c, 91d, 91e. The first part 91a extends so as to intersect the other parts 91b to 91e (substantially orthogonally thereto in the second embodiment). The first part 91a has one free end and the other end to which one end of the second part 91b is continuously joined.

The second to fifth parts 91b to 91e are continuously arranged in this order from the side closer to the first part 91a. That is, one end of the third part 91c is continuously joined to the other end of the second part 91b. One end of the fourth part 91d is continuously joined to the other end of the third part 91c. One end of the fifth part 91e is continuously joined to the other end of the fourth part 91d. The other end of the fifth part 91e is a free end. The third and fourth parts 91c, 91d are bent toward the first part 91a side from the second and fifth parts 91*b*, 91*e*. Hence, the third and fourth parts 91*c*, 91*d* form a V-shaped depression when seen in the first direction X.

On the inside of the side wall part 13, a groove 13*c* extending along the optical axis direction OA of the lens is provided at a position corresponding to the corner 10*c* of the base 10. While being attached to the base 10, the leaf spring 91 is hung on the upper end of the groove 13*c*, whereby the second to fifth parts 91*b* to 91*e* are arranged within the groove 13*c*. As the third and fourth parts 91*c*, 91*d* flex, the leaf spring 91 functions as a spring, so as to generate an urging force F to be applied to the lens holder 30 (see FIG. 11).

The plate member 92 has a rectangular parallelepiped form. The plate member 92 is made of a material having favorable slidability, for example. Examples of the material having favorable slidability include nylon, resins such as polyacetal, metals such as stainless steel, and ceramics such as zirconia and alumina. As illustrated in FIG. 10, the plate member 92 has a pair of main faces S1, S2 opposing each other. The main face S1 opposes the depression of the leaf spring 91 and is in contact with the second and fifth parts 91*b*, 91*e*. The main face S2 has one recess 92*a* formed at its center part.

The recess 92*a* is formed into a quadrangular pyramid having a rectangular opening and tapering down to the inside. Hence, the recess 92*a* is constituted by four planes in the second embodiment. In the second embodiment, one of diagonal lines of the opening in the recess 92*a* is substantially parallel to the optical axis direction OA of the lens. In the second embodiment, the other diagonal line of the opening in the recess 92*a* is substantially orthogonal to the optical axis direction OA of the lens. The recess 92*a* may be shaped into a truncated quadrangular pyramid, a triangular pyramid, or a truncated triangular pyramid instead of the quadrangular pyramid.

The ball member 93 is arranged within the recess 92*a*. The ball member 93 is in point contact with each of the planes of the recess 92*a*. That is, the ball member 93 and recess 92*a* are in contact with each other at four points. Hence, as illustrated in FIG. 10, the rotary axis RA of the ball member 93 extends in a direction orthogonal to the optical axis direction OA of the lens. In the ball member 93, the part on the side opposite from the side in contact with the recess 92*a* comes into contact with a substrate 94.

As illustrated in FIG. 10, the substrate 94 is arranged on the side face 32*a* located on the corner 10*c* side of the base 10 in the side faces of the projection 32 (lens holder 30). The substrate 94 has a pair of main faces S3, S4 opposing each other. The main face S3 opposes the second main face S2 of the plate member 92 and comes into point contact with the ball member 93. The main face S4 is attached to the side wall face 32*a* of the projection 32. The substrate 94 is constituted by SiC, zirconia, or stainless steel, for example. The substrate 94, ball member 93, plate member 92, and leaf spring 91 are thus arranged in this order from the side closer to the side wall face 32*a* in the second direction (the opposing direction of the side wall faces 32*a*, 32*b*).

As illustrated in FIG. 10, a piezoelectric actuator unit (constituted by a piezoelectric actuator 50 and a flexible substrate 60) constructed as in the first embodiment is disposed on a substrate 37 on the side wall face 32*b* located on the side (the corner 10*b* side of the base 10) opposite from the side wall face 32*a* of the projection 32.

A plate member 70 is arranged on the rear face of the surface of the flexible substrate 60 mounted with the piezoelectric actuator 50. An elastic plate 84 is arranged on the rear face of the surface of the plate member 70 mounted with the flexible substrate 60. The elastic plate 84 is attached to the base 10 such that the rear face of the surface of the elastic plate 84 mounted with the plate member 70 comes into contact with the inner peripheral face of the side wall part 13 of the base 10.

The elastic plate 84 elastically deforms, so as to generate an elastic force B to be applied to the piezoelectric actuator 50 through the plate member 70 and flexible substrate 60 as illustrated in FIG. 10. In the second embodiment, when seen in the second direction (the opposing direction of the side wall faces 32*a*, 32*b*), the elastic plate 84 is slightly larger than the piezoelectric actuator 50 and overlaid on the latter as a whole. Hence, the elastic plate 84 applies the elastic force E uniformly to the whole rear face of the piezoelectric actuator 50. The elastic plate 84 can be constructed by various elastic materials such as silicone rubber. The substrate 37, piezoelectric actuator 50, first part 65 of the flexible substrate 60, plate member 70, and elastic plate 84 are thus arranged in this order from the side closer to the side wall face 32*b* in the second direction (the opposing direction of the side wall faces 32*a*, 32*b*) in the second embodiment.

As in the foregoing, the urging member (constituted by the leaf spring 91, plate member 92, and ball member 93) always applies the urging force F to the lens holder 30 so as to make it rotate toward the piezoelectric actuator 50. Therefore, the lens holder 30 and piezoelectric actuator 50 keep a favorable contact state therebetween. In the second embodiment, the respective positions where the urging force F and driving force are applied by the urging member and actuator oppose each other in the lens holder 30 (projection 32), so that the urging force F from the urging member is directed to the piezoelectric actuator 50. This keeps the urging member away from the driving force transmission path from the piezoelectric actuator 50 to the lens holder 30. As a result, the driving force from the piezoelectric actuator 50 is efficiently transmitted to the lens holder 30.

In the second embodiment, as mentioned above, the respective positions where the urging force F and driving force are applied by the urging member and actuator oppose each other in the lens holder 30 (substrate 32), so that the urging force F from the urging member is directed to the piezoelectric actuator 50, whereby the urging force F required for attaining a desirable contact state between the lens holder 30 and piezoelectric actuator 50 is small. This lowers the load acting on the shaft 15, thereby reducing the friction between the shaft 15 and lens holder 30. This can save the driving force for moving the lens holder 30, cut down the power consumption for driving the lens holder 30, and elongate the life of the lens driving device 2.

In the second embodiment, the ball member 93 arranged at the corner 10*c* of the base 10 abuts the substrate 94, thereby restraining the lens holder 30 from swinging away from the piezoelectric actuator 50. That is, a position for inhibiting the lens holder 30 from swinging is set at the corner 10*c* separated from the corner 10*a* where the shaft 15 is arranged. Thus separating the position for restricting the swinging of the lens holder 30 from the shaft 15 can improve the precision of the moving position of the lens holder 30 in the optical axis direction OA of the lens.

In the second embodiment, the urging member has the leaf spring 91, plate member 92, and ball member 93, while the pressure from the leaf spring 91 is applied as the urging force F to the lens holder 30 (projection 32) through the plate member 92, ball member 93, and substrate 94. As a consequence, the urging member for applying the urging force F to the lens holder 30 can be constructed easily at low cost. In the second embodiment, the ball member 93 in contact with the substrate 94 (lens holder 30) is rotatable, so that the friction occurring between the ball member 93 and substrate 94 is very small. This can prevent the ball member 93 from resisting against the movement in the optical axis direction OA of the lens.

In the second embodiment, the shaft 15 is arranged at the corner 10a of the base 10; the piezoelectric actuator 50 is arranged at the corner 10b of the base 10; and the urging member (constituted by the leaf spring 91, plate member 92, and ball member 93) is arranged at the corner 10c of the base 10. The side wall faces 32a, 32b of the lens holder 30 project out of the body 31 of the lens holder 30, so as to be located at the corners 10c, 10b, respectively. The piezoelectric actuator 50 applies the driving force to the side wall face 32b through the substrate 37, while the urging member applies the urging force to the side wall face 32a through the substrate 94. Hence, the shaft 15, piezoelectric actuator 50, and urging member are arranged at the corners 10a, 10b, 10c of the base 10, which are dead spaces. The driving force is provided by the piezoelectric actuator 50 within the corner 10b, while the urging force is provided by the urging member within the corner 10c. Even when the lens holder 30 is made larger, regions for the members for applying the driving force and urging force are secured in dead spaces, whereby the driving force and urging force are not inhibited from being applied to the lens holder 30. This can make the lens holder 30 larger and the lens driving device 2 smaller at the same time. As a result, the lens driving device 2 can be made smaller when the lens holder 30 has a size on a par with that conventionally available. When the lens driving device 2 has a size on a par with that conventionally available, the lens holder 30 can be made larger, whereby a lens having a larger diameter can be mounted to the lens holder 30.

In the second embodiment, the urging member is constituted by the leaf spring 91, plate member 92, and ball member 93, so that the pressure from the leaf spring 91 is applied as the urging force F to the lens holder 30 through the plate member 92, ball member 93, and substrate 94. This simplifies the structure of the urging member applying the urging force F to the lens holder 30, so as to reduce the number of components, whereby the lens driving device 2 can be made at lower cost. Since the ball member 93 arranged within the recess 92a of the plate member 92 is rotatable, the friction occurring between the ball member 93 and lens holder 30 when they come into contact with each other is very small. This can prevent the ball member 93 from resisting against the lens holder 30 moving in the optical axis direction OA of the lens.

In the second embodiment, the elastic plate 84 is interposed between the piezoelectric actuator 50 and the side wall part 13 (base 10). Therefore, the elastic plate 84 can absorb errors occurring, if any, in components. Since the elastic force E generated by the elastic plate 84 presses the piezoelectric actuator 50 to the lens holder 30 through the plate member 70 and flexible substrate 60, the contact state of the actuator 50 with the lens holder 30 is kept appropriately. Therefore, even when the piezoelectric actuator 50 and lens holder 30 positionally deviate from each other, a favorable margin for tilt (inclination of the lens holder 30 with respect to the optical axis of the lens) can be obtained.

Other Embodiments

Though preferred embodiments of the present invention have been explained in the foregoing, the present invention is not necessarily limited to the above-mentioned embodiments, but can be modified in various ways within the scope not deviating from the gist thereof.

The structure of the urging member coming into contact with the lens holder 30 so as to apply the urging force F thereto in the first embodiment is not limited to the one using the spring 71 constituted by a compression coil spring, but may be any of elastically deformable members such as a leaf spring. Similarly, the structure of the urging member coming into contact with the lens holder 30 so as to apply the urging force F thereto in the second embodiment is not limited to the leaf spring 91, but may be any of other elastically deformable members.

The first embodiment may be constructed such that the piezoelectric actuator 50, substrate 73, and ball members 74 are arranged at the corner 10c, while the spring 71 is arranged at the corner 10b or 10d. In this case, the position where the driving force is provided by the piezoelectric actuator 50 is located farther from the shaft 15, so that a gouge or the like may occur between the shaft 15 and the lens holder 30, thereby exerting a load on the movement of the lens holder 30.

The elastic plate 84 is attached to the base 10 in the second embodiment, but may be bonded to the base 10 by an adhesive or the like, fitted to the base 10, or held between the plate member 70 and the inner peripheral face of the side wall part 13 of the base 10. Other members may be interposed between the elastic plate 84 and the base 10 or plate member 70.

The elastic plate 84 is slightly larger than the piezoelectric actuator 50 when seen in the second direction in the second embodiment, but not limited in terms of the size, form, and number as long as it can apply an elastic force with balance to the rear face of the piezoelectric actuator 50. Specifically, the elastic plate 84 may have a size on a par with or smaller than that of the piezoelectric actuator 50 when seen in the second direction. The elastic plate 84 may have various forms such as circles and crosses as well as rectangles. The number of elastic plates 84 is not restricted to 1, but may be 2 or more. When there are two or more elastic plates 84, it is preferred for the elastic plates 84 to be arranged so as to correspond to the respective corners of the piezoelectric actuator 50 when seen in the second direction, while various other arrangements may also be employed.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A lens driving device comprising:
    a lens holder holding a lens;
    a shaft supporting the lens holder so as to make the lens holder movable in an optical axis direction of the lens and swingable about an axis of the shaft;
    an actuator applying a driving force to the lens holder so as to move the lens holder in the optical axis direction; and
    an urging member applying an urging force to the lens holder so as to rotate the lens holder toward the actuator;
    wherein, the lens holder has a part arranged between the actuator and the urging member in a linear manner when seen from the optical axis direction of the lens, and
    wherein the urging force from the urging member is applied to the part of the lens holder and is conveyed to the actuator via the part of the lens holder.

2. The lens driving device according to claim 1, further comprising a housing accommodating the lens holder, the shaft, the actuator, and the urging member;
    wherein the shaft is arranged at a first corner of the housing;
    wherein the actuator is arranged at a second corner of the housing adjacent to the first corner; and
    wherein the urging member is arranged over the second corner and a third corner of the housing diagonally opposite from the first corner.

3. The lens driving device according to claim 1,
    wherein the urging member comprises:

a spring;
an arm member having one end in contact with the spring;
a substrate in contact with the other end of the arm member; and
a ball member in contact with the substrate and the lens holder while being supported so as to be rotatable with respect to the lens holder and the substrate;
wherein a pressure from the spring is applied as the urging force to the lens holder through the aim member, the substrate, and the ball member.

4. The lens driving device according to claim 3, further comprising a housing accommodating the lens holder, the shaft, the actuator, and the urging member;
wherein the shaft is arranged at a first corner of the housing;
wherein the actuator, the substrate, and the ball member are arranged at a second corner of the housing adjacent to the first corner;
wherein the spring is arranged at a third corner of the housing diagonally opposite from the first corner; and
wherein the arm member is arranged so as to extend between the second corner and the third corner.

5. The lens driving device according to claim 1, further comprising a housing accommodating the lens holder, the shaft, the actuator, and the urging member;
wherein the shaft is arranged at a first corner of the housing;
wherein the actuator is arranged at a second corner of the housing adjacent to the first corner;
wherein the urging member is arranged at a third corner of the housing diagonally opposite from the first corner;
wherein the lens holder has:
a cylindrical body;
a first surface projecting out of the body and being located at the second corner; and
a second surface projecting out of the body, opposing the first surface, and being located at the third corner;
wherein the actuator applies the driving force to the first surface; and
wherein the urging member applies the urging force to the second surface.

6. The lens driving device according to claim 5,
wherein the urging member comprises;
a spring;
a base including a first main face in contact with the spring and a second main face, formed with a recess, opposing the first main face; and
a ball member arranged so as to be rotatable within the recess of the base;
wherein a pressure from the spring is applied as the urging force to the lens holder through the base and the ball member.

7. The lens driving device according to claim 5, further comprising an elastic member generating an elastic force for pressing the actuator to the lens holder.

8. The lens driving device according to claim 1, further comprising an elastic member generating an elastic force for pressing the actuator to the lens holder.

9. A lens driving device comprising:
a lens holder holding a lens;
a shaft supporting the lens holder so as to make the lens holder movable in an optical axis direction of the lens and swingable about an axis of the shaft;
an actuator applying a driving force to the lens holder so as to move the lens holder in the optical axis direction;
an urging member applying an urging force to the lens holder so as to rotate the lens holder toward the actuator; and
a housing accommodating the lens holder, the shaft, the actuator, and the urging member,
wherein the shaft is arranged at a first corner of the housing,
wherein the actuator is arranged at a second corner of the housing adjacent to the first corner,
wherein the urging member is arranged over the second corner and a third corner of the housing, the third corner being diagonally opposite from the first corner, and
wherein, in the lens holder, a position where the urging force is applied by the urging member and a position where the driving force is applied by the actuator oppose each other, so that the urging force from the urging member is directed to the actuator.

10. The lens driving device according to claim 9,
wherein the urging member comprises:
a spring;
an arm member having one end in contact with the spring;
a substrate in contact with an other end of the arm member; and
a ball member in contact with the substrate and the lens holder while being supported so as to be rotatable with respect to the lens holder and the substrate;
wherein a pressure from the spring is applied as the urging force to the lens holder through the arm member, the substrate, and the ball member,
wherein the actuator, substrate, and ball member are arranged at the second corner,
wherein the spring is arranged at the third corner, and
wherein the arm member is arranged so as to extend between the second corner and the third corner.

11. The lens driving device according to claim 9, further comprising an elastic member generating an elastic force for pressing the actuator to the lens holder.

12. The lens driving device according to claim 9,
wherein the urging member, the lens holder and the actuator are arranged in this order in the direction of the urging force from the urging member to the lens holder, and
wherein the urging member applies the urging force to the actuator via the lens holder.

13. A lens driving device comprising:
a lens holder holding a lens;
a shaft supporting the lens holder so as to make the lens holder movable in an optical axis direction of the lens and swingable about an axis of the shaft;
an actuator applying a driving force to the lens holder so as to move the lens holder in the optical axis direction;
an urging member applying an urging force to the lens holder so as to rotate the lens holder toward the actuator; and
a housing accommodating the lens holder, the shaft, the actuator, and the urging member;
wherein the shaft is arranged at a first corner of the housing;
wherein the actuator is arranged at a second corner of the housing adjacent to the first corner;
wherein the urging member is arranged at a third corner of the housing diagonally opposite from the first corner;
wherein the lens holder has:
a cylindrical body;
a first surface projecting out of the body and being located at the second corner; and
a second surface projecting out of the body, opposing the first surface, and being located at the third corner;
wherein the actuator applies the driving force to the first surface, wherein the urging member applies the urging force to the second surface, and wherein, in the lens holder, a position where the urging force is applied by the urging member and a position where the driving force is applied by the actuator oppose each other, so that the urging force from the urging member is directed to the actuator.

14. The lens driving device according to claim 13, wherein the urging member comprises;
- a spring;
- a base including a first main face in contact with the spring and a second main face, formed with a recess, opposing the first main face; and
- a ball member arranged so as to be rotatable within the recess of the base;

wherein a pressure from the spring is applied as the urging force to the lens holder through the base and ball member.

15. The lens driving device according to claim 13, further comprising an elastic member generating an elastic force for pressing the actuator to the lens holder.

16. The lens driving device according to claim 13,
wherein the urging member, the lens holder and the actuator are arranged in this order in the direction of the urging force from the urging member to the lens holder, and wherein the urging member applies the urging force to the actuator via the lens holder.

* * * * *